3,389,158
PROCESS OF PREPARING TRIMETHYLTIN HALIDES

Bernard G. Kushlefsky, Edison, N.J., assignor to M & T Chemicals Inc., New York, N.Y., a corporation of Delaware
No Drawing. Filed Aug. 5, 1963, Ser. No. 300,106
11 Claims. (Cl. 260—429.7)

ABSTRACT OF THE DISCLOSURE

Trimethyltin halide may be prepared by the reaction of one equivalent of tin tetrahalide, e.g., tin tetrachloride, with three equivalents of tetramethyltin, the reaction mixture being maintained at temperature above the melting point of tetramethyltin and below 100° C. to give high yield of product.

---

This invention relates to the production of organotin compounds. More specifically, it relates to a novel process for producing organotin compounds.

As is well known to those skilled-in-the-art, high purity organotin compounds, such as methyltin halides, e.g., trimethyltin chloride, may be prepared by techniques which require use of high temperatures, extended times, and lengthy workup including, e.g., distillation or recrystallization. It is well known that the procedures for obtaining such compounds involve, in the case of trimethyltin chloride, reaction at elevated temperature, typically reflux temperature at about 156° C. (the boiling point of trimethyltin chloride). Furthermore, prior art techniques have indicated that it was not possible to attain product unless the reaction were carried out for an extended period of time—typically as long as three hours. The classic statement of this reaction indicates that it must be heated by external means to temperatures as high as 160° C. for more than three hours. When the reaction is carried out under conditions such as these, the yields are low (typically as low as 70% of theoretical even when using highly purified starting materials). The failure to realize optimum yields may be due in part to pyrolysis occurring at the high temperatures resulting from the high heat input over the extended period of time which contributes to the production of undesirably large quantities of by-products.

It is an object of this invention to disclose a novel technique for synthesizing trimethyltin chloride in substantially stoichiometric yield at moderate temperature. Other objects will be apparent to those skilled-in-the-art on inspection of the following description.

In accordance with certain of its aspects, the novel process of this invention for preparing trimethyltin halide comprises reacting three equivalents of tetramethyltin with one equivalent of tin tetrahalide thereby forming a reaction mixture, maintaining said reaction mixture at temperature above the melting point of tetramethyltin and below 100° C. thereby forming trimethyltin halide, and withdrawing as product the compound trimethyltin halide from said reaction mixture.

The tin tetrahalide $SnX_4$, which may be employed in the practice of this invention may preferably be one wherein the halide X is preferably selected from the group consisting of chloride and bromide. Preferably, X will be chloride and the compound may be tin tetrachloride.

Tetramethyltin which may be employed in the practice of this invention may preferably be substantially pure tetramethyltin. It is, however, a feature of this invention that impure tetramethyltin (containing, e.g., either solvents such as ether, toluene, or tetrahydrofuran or other methyltin compounds such as dimethyltin dichloride) may be employed without any substantial decrease in yield based upon the tetramethyltin content of the material.

In practice of this invention, one mole or equivalent of tin tetrahalide, preferably tin tetrachloride, may be added to a reaction vessel together with about three moles or equivalents of tetramethyltin. Preferably one reactant, e.g., tin tetrahalide, may be slowly dropped into a body of the other reactant, e.g., tetramethyltin. During the reaction, trimethyltin halide, typically trimethyltin chloride, may be formed as follows:

$$3(CH_3)_4Sn + SnCl_4 \rightarrow 4(CH_3)_3SnCl$$

It is a feature of this invention that the reaction may be carried out in the presence of inert diluent or solvent. Typically, the diluent may be an inert hydrocarbon such as an aromatic hydrocarbon such as benzene, xylene, toluene, etc. or an aliphatic hydrocarbon such as hexane, heptane, octane, etc., a cycloaliphatic compound such as cyclohexane, methylcyclohexane, etc. or other inert diluents including, e.g., tetrahydrofuran, methyltetrahydrofuran, ethyl ether, etc.

The reaction mixture, optionally containing diluent-solvent, may preferably be agitated. The typical reaction, e.g., between tetramethyltin and tin tetrachloride to form trimethyltin chloride, may occur substantially instantaneously. The reaction mixture may be agitated, typically at least during the addition, for a period of 15–90 minutes, during which time the temperature of reaction may rise from room temperature of about 20° C. to as high as about 100° C. Preferably, the temperature may be maintained at a point above the melting point of the trimethyltin halide, e.g., trimethyltin chloride (M.P. 36° C.–40° C.) or trimethyltin bromide (M.P. 27° C.) and below the boiling point of the tetramethyltin (78° C.), this being effected by appropriate cooling technique. The preferred reaction temperature, which may, if necessary, be maintained by appropriate cooling, may be 40° C.–70° C. It will be apparent that the reaction may preferably be carried out at temperature below 20° C., e.g., down to above about −54° C., the melting point of tetramethyltin, the lowest melting component of the system. Preferably the system will be at temperature at which it is homogeneous, i.e., above the melting point of the starting materials. More preferably the reaction may be carried out above 31° C., the melting point of tin tetrabromide, or when tin tetrachloride is used, above −35° C., the melting point of tin tetrachloride. Commonly, however, the reaction may be carried out at 20° C.–100° C.

It is a particular feature of this invention that during reaction, it is not necessary to add heat. The heat generated by the reaction may normally be sufficient to raise the temperature of the reaction mixture from room temperature to within the range indicated. At the temperatures noted, the reaction mixture is substantially below the reflux temperature—product trimethyltin chloride boils at 156° C.

In accordance with the preferred embodiment of this invention, the reaction mixture, after completion of the reaction, may be permitted to cool by natural convection. Cooling may normally take one to four hours. During this period, fine crystals may form as the temperature drops to and remains at about 35° C. (for the reaction mixture containing no diluent or solvent). The reaction temperature may remain at this point until crystallization is completed.

If desired, however, crystallization may be effected quickly by, e.g., cooling the reaction mixture substantially immediately as by application of external cooling, or by pouring the reaction mixture into a cold solvent, e.g., petroleum ether or hexane, in which trimethyltin chloride may be insoluble.

If desired, the solidified contents of the vessel may be melted and poured into appropriate cooling pans wherein it may be crystallized in form which can readily be reduced to desired particle size.

If the charge materials to reaction vessel, particularly the tetramethyltin, are not substantially pure, it may be found that, in addition to product trimethyltin chloride, the reaction vessel at the end of the reaction may contain a liquid, e.g. typically a liquid mixture of other methyltins or ether or solvent, then this liquid may be separated from the product trimethyltin chloride as by filtration. Preferably the separated liquid may be further treated e.g. as by distillation to obtain additional quantities of desired product.

The product trimethyltin chloride obtained by this reaction normally may be recovered in yields approaching 100% based upon the tetramethyltin employed. The product trimethyltin chloride may normally be of very high purity above 97%, and usually above 99%.

Practice of this invention may be observed from the following examples wherein the parts are parts by weight unless otherwise noted.

EXAMPLE 1

In this example which illustrates practice of the invention, 1609.5 parts (9 moles) of tetramethyltin may be charged to a reaction vessel fitted with an agitator. 781.6 parts (3 moles) of tin tetrachloride may be added dropwise to the body of tetramethyltin, and the pot temperature gradually may rise from room temperature of 25° C. to 78° C. The reaction mixture may be cooled to maintain temperature at about 75° C. Over the period of 55 minutes during which the tin tetrachloride may be added, the pot temperature may drop because of the cooling, to 33° C. Cooling may be discontinued after the tin tetrachloride has been added. Temperature may rise to 43° C. and the reaction mixture allowed to cool. At 35° C., crystals may start to form, and the temperature may remain at this point for five hours during which time crystallization may continue and the contents solidify. The product trimethyltin chloride may be obtained in amount of 2290 parts (95.8% yield)—melting point of 36° C.–40.2° C. (theoretical 37° C.). Sn found 59.18% (calc. 59.57%); Cl found 17.77 % (calc. 17.79%) Analysis by Vapor Phase Chromatography indicated that the product was 100 mole percent pure trimethyltin chloride.

EXAMPLE 2

In this example, 1073 parts (6 moles) of tetramethyltin may be charged into a reaction vessel fitted with agitation. 521 parts (2 moles) of tin tetrachloride may be dropped into the flask through a dropping funnel. The pot temperature may rise from 23° C., as the exothermic reaction occurs, to a maximum temperature after 65 minutes of 93° C. at which time all of the tin tetrachloride may have been added. The water-white reaction mixture may be allowed to cool with stirring to 37° C. at which point crystallization may start. The agitator may be stopped and the product permitted to crystallize.

The crystallized reaction mixture may be removed from the reaction vessel and broken into small pieces. 1558 parts (98.5% yield) may be obtained of trimethyltin chloride having a melting point of 36.5° C.–39.8° C. Tin content may be 59.32% found (calc. 59.57%) and the chloride content 17.79% found (17.79% calculated).

EXAMPLE 3

In this example which illustrates practice of the invention using impure starting materials, 2146 parts (12 moles) of impure tetramethyltin containing 4.5% tetrahydrofuran may be added to a reaction vessel. 1042 parts (4 moles) of tin tetrachloride may be gradually dropped into the reaction vessel with agitation. The pot temperature may rise from 26° C.–102° C., at which point all of the tin tetrachloride may have been added to the reaction vessel. The water-white reaction mixture may be permitted to cool. At 36° C., crystals may start to form, agitation may be stopped, and the reaction mixture may be permitted to stand for 60 hours.

At the end of this time, the reaction mixture may have substantially solidified and contain a liquid layer. After crushing, the mixture may be filtered and air dried. Product trimethyltin chloride may be obtained in amount of 2322 parts (a yield of 76.5% based on tetramethyltin). This material may be found to have a melting point of 36.3° C. to 38.5° C. Analysis: 58.78% Sn (59.37 calculated) and 17.98% Cl (17.79% calculated).

The liquid recovered from the filtration operation, 760 parts, may be treated to recover therefrom additional yield of trimethyltin chloride to permit attainment of total yields which may be substantially stoichiometric. This may be effected by distillation at reduced pressure (or crystallization by cooling below room temperature) of the components of the mixture including ether and undesired methyl tins to permit attainment of desired trimethyltin chloride.

EXAMPLE 4

In this example which illustrates practice of the invention using diluent-solvent, 214.6 parts (1.2 moles) of tetramethyltin may be added to a reaction vessel, together with 33 parts of diluent-solvent hexane. 104.2 parts (0.4 mole) of tin tetrachloride may be gradually dropped into the reaction vessel as the reaction medium is agitated. Temperature may rise to 86° C. at the end of addition of the tin tetrachloride. On cooling to 0° C., crystals may precipitate from the water-white reaction mixture. Filtration of these crystals, followed by air drying, may yield 263 parts (82.6% yield) of trimethyltin chloride. Recovery of 40 parts of trimethyltin chloride from the filtrate may be effected by distillation at atmospheric pressure to yield trimethyltin chloride as pure residue.

EXAMPLE 5

In this example, 214.6 parts (1.2 moles) of tetramethyltin may be added to a reaction vessel. 104.2 parts (0.4 mole) of tin tetrachloride may then be gradually over 16 minutes dropped into the reaction vessel as the reaction mixture is agitated. The pot temperature may be uniformly controlled by external cooling so as to be maintained constant at temperature of approximately 20° C. during addition of tin tetrachloride. After the addition is complete, cooling may be continued for an addition 17 minutes and the temperature drop to 13° C. whereupon crystallization commences and the cooling may be removed. The temperature may then rise to 26° C. and the reaction mixture allowed to stand for 12 hours. The solidified reaction mixture may be removed from the flask and may be found to be trimethyltin chloride with a melting point of 36.5° C.–39.5° C., obtained in amount of 308 parts (96.6% yield).

It will be apparent to those skilled-in-the-art that this invention has been described with reference to certain specific embodiments and that various changes and modifications may be made which fall within the scope of this invention.

I claim:

1. The process for preparing trimethyltin halide which comprises reacting one equivalent of tin tetrahalide with three equivalents of tetramethyltin thereby forming a reaction mixture, maintaining said reaction mixture at temperature above the melting point of tetramethyltin and below 100° C. thereby forming trimethyltin halide, and withdrawing trimethyltin halide from said reaction mixture.

2. The process for preparing trimethyltin halide which comprises reacting one equivalent of tin tetrahalide with three equivalents of tetramethyltin thereby forming a reaction mixture, maintaining said reaction mixture at temperature above the melting point of the starting materials and below 100° C. thereby forming trimethyltin halide, and withdrawing trimethyltin halide from said reaction mixture.

3. The process for preparing trimethyltin halide which comprises reacting one equivalent of tin tetrahalide with three equivalents off tetramethyltin thereby forming a reaction mixture, maintaining said reaction mixture at temperature of 20° C.–100° C. thereby forming trimethyltin halide, and withdrawing trimethyltin halide from said reaction mixture.

4. The method of claim 3 wherein said tin tetrahalide is tin tetrachloride thereby forming trimethyltin chloride.

5. The method of claim 3 wherein said reaction mixture is maintained at temperature above the melting point of the trimethyltin halide and below the boiling point of tetramethyltin.

6. The method claimed in claim 3 wherein said reaction mixture is maintained at temperature of about 40° C.–70° C.

7. The method of claim 3 wherein said temperature is maintained by cooling said reaction mixture.

8. The method of claim 3 wherein said reaction mixture contains an inert diluent.

9. The process for preparing trimethyltin halide which comprises maintaining a body of three equivalents of tetramethyltin, adding one equivalent of tin tetrahalide to said body of tetramethyltin thereby forming a reaction mixture, maintaining said reaction mixture at temperature of 20° C.–100° C. thereby forming trimethyltin halide, and withdrawing trimethyltin halide from said reaction mixture.

10. The process for preparing trimethyltin chloride which comprises reacting one equivalent of tin tetrachloride with three equivalents of tetramethyltin thereby forming a reaction mixture, maintaining said reaction mixture at temperature of 40° C.–70° C. thereby forming trimethyltin chloride, and withdrawing trimethyltin chloride from said reaction mixture.

11. The process for preparing trimethyltin chloride which comprises reacting one equivalent of tin tetrachloride with three equivalents of tetramethyltin thereby forming a reaction mixture, maintaining said reaction mixture at temperature of 40° C.–70° C. thereby forming trimethyltin chloride, cooling said reaction mixture to 20° C.–about 35° C. thereby crystallizing said trimethyltin chloride, and withdrawing trimethyltin chloride from said reaction mixture.

References Cited
UNITED STATES PATENTS 3,248,411   4/1966   Neumann et al. _____ 260—429.7

OTHER REFERENCES

Kozeschkow: Chem. Ber., vol. 66 (1933), pages 1661 to 1663, QD1.D4.

TOBIAS E. LEVOW, *Primary Examiner.*

W. F. W. BELLAMY, *Assistant Examiner.*